United States Patent [19]

Casey

[11] Patent Number: 5,069,586

[45] Date of Patent: Dec. 3, 1991

[54] SELF-LOCKING TWO-PART GROMMET

[76] Inventor: Marion B. Casey, 1249 Collard Valley Rd., Cedartown, Ga. 30125

[21] Appl. No.: 573,444

[22] Filed: Aug. 27, 1990

[51] Int. Cl.$^5$ .................. F16B 19/00; F16B 21/00
[52] U.S. Cl. .................. 411/339; 411/508; 411/908; 411/913; 29/525.1
[58] Field of Search .............. 411/338, 339, 508, 509, 411/510, 913, 908, 431; 24/104, 108, 453, 713.6, 713.8; 29/525, 525.1

[56] References Cited

U.S. PATENT DOCUMENTS

| | | | |
|---|---|---|---|
| 1,780,555 | 11/1930 | Johnson | 411/339 |
| 3,678,535 | 7/1972 | Charles | 411/339 |
| 4,557,654 | 12/1985 | Masuda et al. | 411/431 |
| 4,761,860 | 8/1988 | Krauss | 411/339 |

Primary Examiner—Neill R. Wilson
Attorney, Agent, or Firm—Michael V. Drew

[57] ABSTRACT

A grommet has a female member and a male member. Each member consists of a sleeve with a flange formed at one end. The sleeve of the male member is slightly smaller than the bore of the sleeve of the female member. A locking mechanism for the grommet consists of an annular groove inscribed within the inner surface of the sleeve of the female member and a slightly-offset, matching annular lip formed upon the outer surface of the sleeve of the male member. The annular groove and annular lip are offset so that the two members remain in tension, pulling toward one another when the grommet is locked in place. The grommet is locked in place by inserting the male member into the female member and urging them together until the annular lip fits within the annular groove. The grommet may be disassembled by placing a dowel or like object against the non-flanged end of the male member and striking the male member or otherwise applying a force thereto. The flange of the male member and the flange of the female member may each have an annular indentation on their respective bottom surfaces that separates each bottom surface into an outer annular bottom surface and an inner annular bottom surface. This indentation allows each flange to flex slightly and creates a snug fit of the flanges against the side of a partition, wall or other surface through which the grommet has been placed.

19 Claims, 2 Drawing Sheets

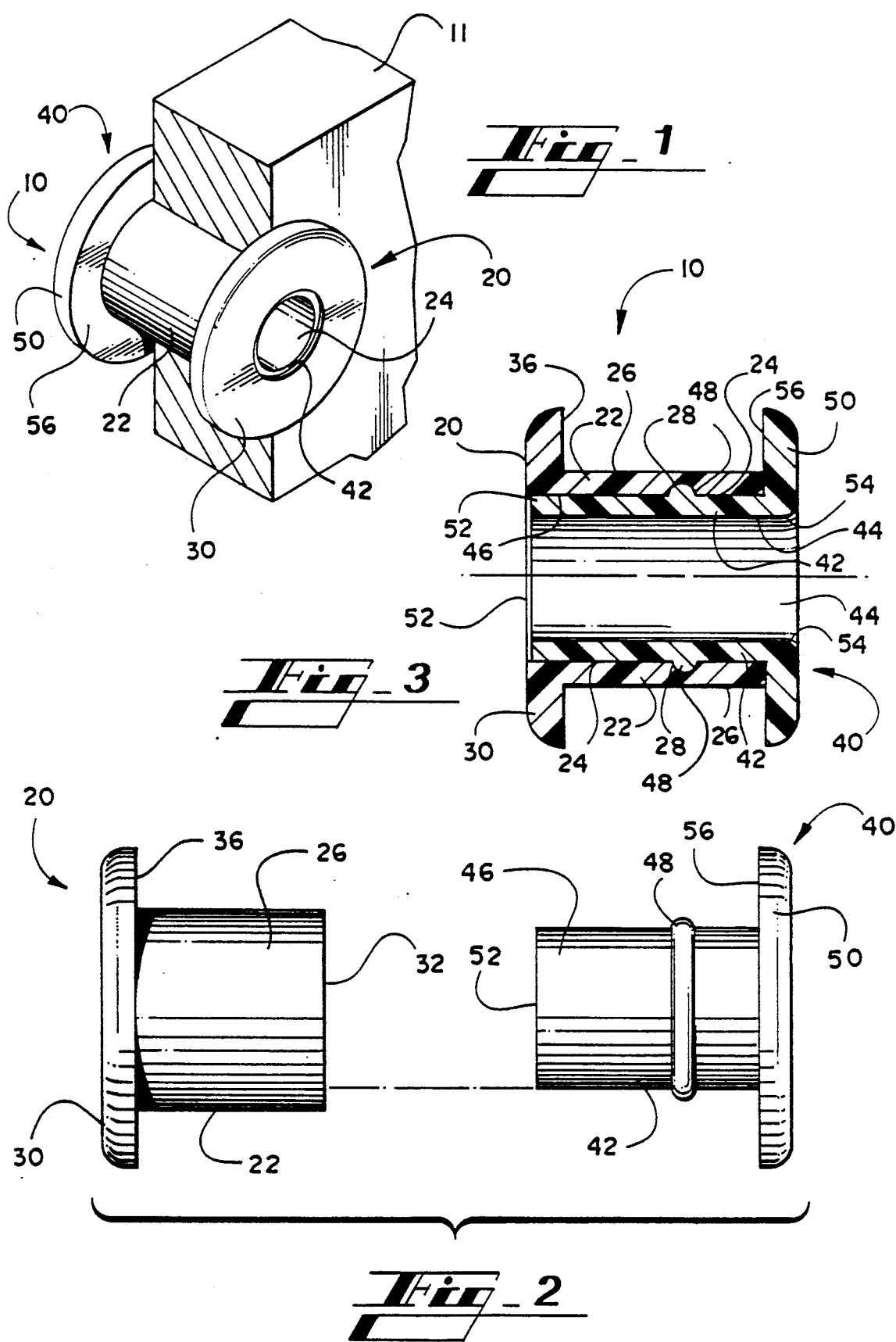

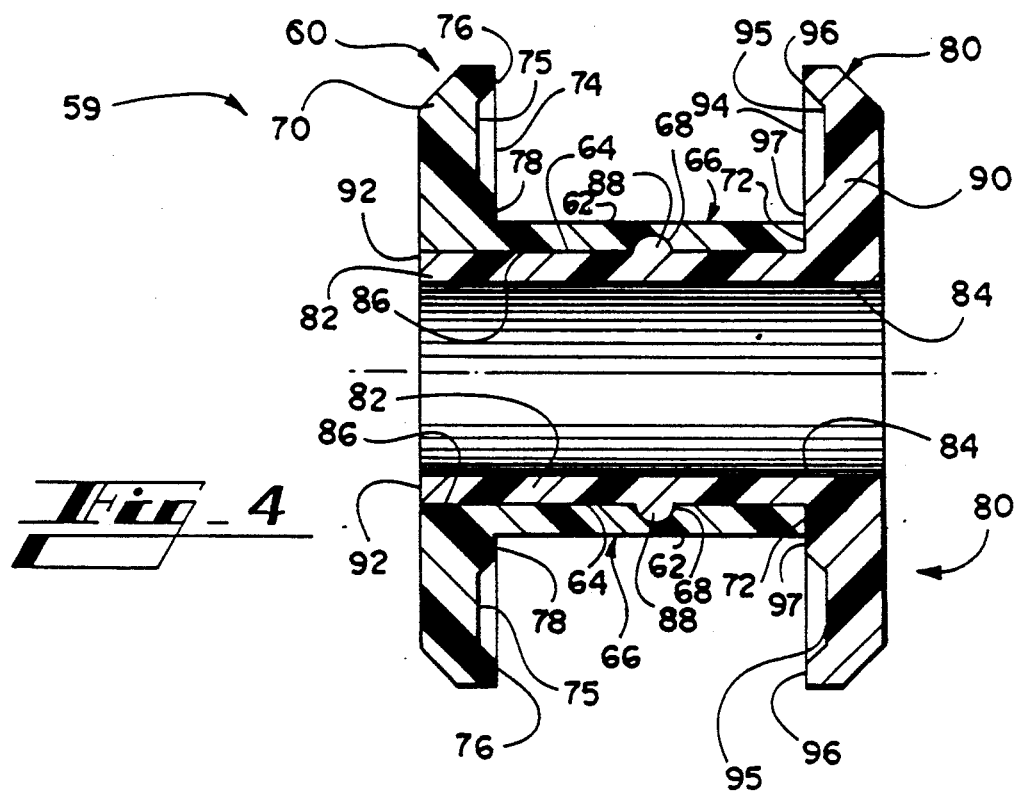
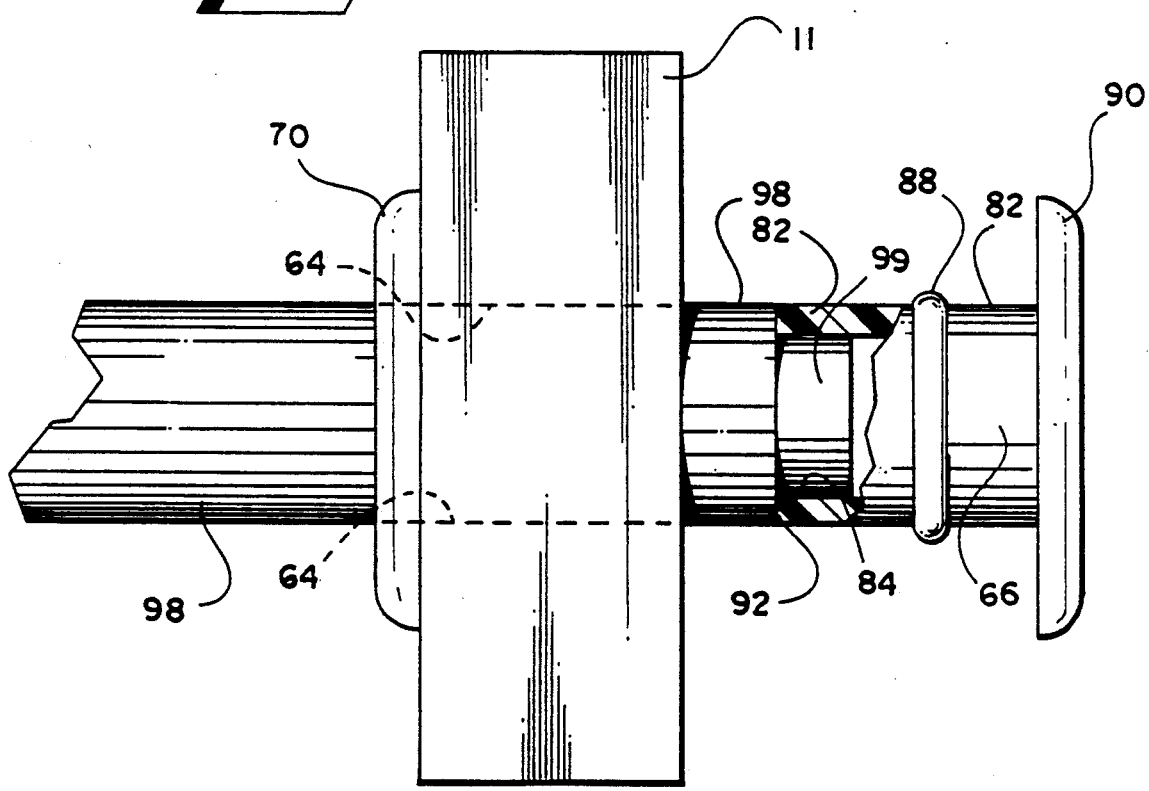

SELF-LOCKING TWO-PART GROMMET

TECHNICAL FIELD OF THE INVENTION

The invention relates to grommets, and more particularly to self-locking grommets.

BACKGROUND OF THE INVENTION

The usefulness of grommets have been limited for several reasons. The usefulness of some grommets have been limited because they have been too difficult to install or remove. The usefulness of some grommets has been limited because they wear easily, are degraded by the temperature or temperature changes in their environment, are degraded by water, or are degraded by solvents, fuels, strippers, greases, oils and similar substances. The usefulness of some grommets such as rubber grommets has been limited because they cannot withstand forces applied upon them in use.

SUMMARY OF THE INVENTION

It is an object of the invention to provide a grommet which is easy to install and remove.

It is also an object of the invention to provide a grommet which is wear-resistant, temperature-resistant, impervious to water, and impervious to solvents, fuels, strippers, greases, oils and similar substances.

The present invention is directed to a grommet which has a female member and a male member. Each member consists of a sleeve with a flange formed at one end. The sleeve of the male member is slightly smaller than the bore of the sleeve of the female member. This allows the sleeve of the male member to be inserted into the bore of the sleeve of the female member. A locking mechanism for the grommet consists of an annular groove inscribed within the inner surface of the sleeve of the female member and a slightly-offset, matching annular lip formed upon the outer surface of the sleeve of the male member. The annular groove and annular lip are offset in their positions upon their respective sleeves so that the two members remain in tension pulling toward one another when the grommet is locked in place. The grommet is locked in place by inserting the male member into the female member and urging them together until the annular lip fits within the annular groove. The grommet may be disassembled by placing a dowel or like object against the non-flanged end of the male member and striking the male member or otherwise applying a force thereto. The flange of the male member and the flange of the female member may each have an annular indentation on their respective bottom surfaces that separates each bottom surface into an outer annular bottom surface and an inner annular bottom surface. This indentation allows each flange to flex slightly and enhances a snug fit of the flanges against the side of a partition, wall or other surface through which the grommet has been placed. The snugness of fit can be further enhanced by making the depth of the outer annular bottom surfaces slightly greater than the depth of the inner annular bottom surfaces.

Other aspects, objects, features, and advantages of the present invention will become apparent to those skilled in the art upon reading the detailed description of preferred embodiments in conjunction with the accompanying drawings and appended claims.

BRIEF DESCRIPTION OF THE DRAWINGS

FIG. 1 is an isometric illustration of a grommet embodying teachings of the invention.

FIG. 2 is a side view of the grommet of FIG. 1 illustrating the two separate parts of the grommet.

FIG. 3 is a sectional view of the grommet of FIG. 1 taken along a longitudinal axis.

FIG. 4 is a sectional view of a grommet embodying further teachings of the invention taken along a longitudinal axis.

FIG. 5 is a side view illustrating the removal of the grommet of FIG. 1.

DETAILED DESCRIPTION OF A PREFERRED EMBODIMENT OF THE INVENTION

While the specification concludes with claims particularly pointing out and distinctly claiming the subject matter which is regarded as the present invention, the invention will now be described by reference to the following description of an embodiment taken in conjunction with the accompanying drawings.

Reference will be made to FIGS. 1-5 in which the same numbers are indicative of the same elements throughout the figures. A grommet 10 embodying the teachings of the present invention is illustrated in FIG. 1. The grommet 10 is shown inserted through a wall 11 or like partitioning structure. The male member 40 is inserted within the female member 20.

Referring now also to FIG. 2, the grommet 10 is illustrated with the female member 20 separated from the male member 40. The female member 20 consists of a female member sleeve 22 which has a female member flange 30 formed at one end. The other end 32 of the female member sleeve 22 remains open. The outer surface 26 of the female member sleeve 22 is also illustrated. The male member 40 consists of a male member sleeve 42 with a male member flange 50 formed at one end. The other end 52 of the male member sleeve 42 remains open. For the sake of convenience in describing the invention, the un-flanged ends of the female member 20 and male member 40 are referred to as the open end 32 of the female member 20 and the open end 52 of the male member 40, respectively. Each sleeve has a bore running through it. The male member sleeve 42 is slightly smaller than the bore of the female member sleeve 22 so that the male member sleeve 42 may fit easily but snugly into the bore of the female member sleeve 22. Although the sleeves 22 and 42 in the embodiment illustrated are cylindrical, they may be made in other suitable geometric configurations. For example, the sleeves may be hexagonal or octagonal. A suitable allowance between the bore or the inner surface 24 of the female member sleeve 22 and the outer surface 46 of the male member sleeve 42 is 0.002 inch to 0.004 inch. An annular lip 48 protrudes from the outer surface 46 of the male member sleeve 42. The bottom surface 36 of the flange 30 and the bottom surface 56 of the flange 50 are essentially flat so that they snugly fit any partition or wall 11, as was illustrated in FIG. 1.

Referring now to FIG. 3, a sectional view of the grommet 10 further illustrates the structure of the female member 20 and the male member 40 and the manner in which the female member 20 and the male member 40 interconnect. The female member sleeve 22 is formed by an outer surface 26 and an inner surface 24. The inner surface 24 of the female member sleeve 22 defines the bore which runs through the female member 20. The male member sleeve 42 is defined by an outer surface 46 and an inner surface 44. The inner surface 44 of the male member sleeve 42 defines the bore which runs through the male member 40. As mentioned above, an annular lip 48 is formed on the outer surface 46 of the male member sleeve 42. An annular groove 28 is inscribed in the bore 24 of the female member sleeve 22. The annular groove 28 and annular lip 48 correspond to one another. They form the mechanism for locking together the female member 20 and male member 40. The annular groove 28 and annular lip 48 cooperate to lock the female member 20 and male member 40 of the grommet together when the male member sleeve 42 is inserted into the bore 24 and the two members 20 and 40 are urged together. The grommet 10 is fabricated from hardened plastic or nylon. This creates a strong, durable article but also one that allows for sufficient flexibility so that the annular lip 48 can slide into the annular groove 28. Grommets made from these substances, hardened plastic and nylon, are not degraded as easily as rubber grommets. They can in general withstand higher and lower temperatures than rubber grommets, and can better withstand extreme variations in temperature. Grommets made from these substances are more resistant to degradation by water and degradation by solvents, fuels, strippers, greases, oils and similar substances. Hardened plastic and nylon grommets 10 are lighter than rubber grommets of comparable size. This is particularly important when large grommets or many grommets must be used in an environment where controlling the overall weight of the structure is important, for example, in aircraft construction. The lip and groove can take many configurations, for example, the may be triangular or wedge-shaped. However, the toroidal configuration works well and is illustrated in the embodiment shown. A particular sized groove 28 which works well is one having a depth measured from the inner surface of the female sleeve member of about 0.030 of an inch. A groove width which works well for the toroidal annular groove 28 is a groove width of from about 1/16 of an inch to about 3/32 of an inch. An additional feature of the grommet 10 described herein is that not only does it lock but the flanges 30 and 40 remain in tension pulling toward the center of the grommet 10 upon locking. This is accomplished by making the distance between the annular groove 28 and the open end 32 of the female member sleeve 22 slightly greater than the distance between the annular lip 48 and the bottom surface 56 of the male member flange 50. Thus, when the annular lip 48 engages the annular groove 28 the annular lip 48 is not able to completely seat itself in the annular groove 28 because the open end 32 of the female member sleeve 22 abuts the bottom surface 56 of the male member flange 50. The tension thereby created makes the two members 20 and 40 pull together. This creates a tight fit for the grommet when locked. If the female member sleeve 22 is equal to the width of a wall, partition or other structure through which the grommet 10 is placed, the bottom surfaces 36 and 56, respectively, of the flanges fit snugly against a partition, wall or other object which they contact. FIG. 3 also illustrates the rounded corners 54 at the opening of the bore 44 at the flanged end of the male member sleeve 42. This allows for less resistance to any items, such as but not limited to wires, which may be placed into or through the bore 44. The open end 52 of the male member sleeve 22 may also be rounded to facilitate easier insertion or removal of items.

Referring now to FIG. 4, a grommet 59 of essentially the same configuration as the grommet 10 previously discussed is illustrated. The difference in the two is that the grommet 59 illustrated in FIG. 4 contains an indentation in the bottom surfaces 74 and 94, respectively, of the flanges of the female member 60 and male member 80, respectively. The elements of the female member 60 and male member 80 of the grommet 59 of FIG. 4 correspond to the elements of the female and male members of the grommet 10 of FIGS. 1-3. The female member 60 has a female member sleeve 62 formed by an outer surface 66 and an inner surface 64. The inner surface 64 forms a bore through the female member sleeve 62. A female member flange 70 is formed on one end of the female member sleeve 62 while the other end is an open end 72. The female member flange 70 has a bottom surface 74. An annular groove 68 is formed in the bore 64 of the female member sleeve 62. The male member 80 has a male member sleeve 82 formed by an outer surface 86 and an inner surface 84. The inner surface 84 forms the bore through the male member sleeve 82. A male member flange 90 is formed at one end of the male member sleeve 82 while the other end is an open end 92. The male member flange 90 has a bottom surface 94. An annular lip 88 is formed on the outer surface 86 of the male member sleeve 82. An annular indentation 75 in the bottom surface 74 of the female member flange 70 separates the bottom surface 74 into an outer annular surface 76 and an inner annular surface 78. An annular indentation 95 in the bottom surface 94 of the male member flange 90 creates an outer annular surface 96 and an inner annular surface 97 on the bottom surface 94 of the male member flange 90. Upon installation of the grommet 59 through a wall, the indentations cause the flanges to flex more against the wall as the female and male members of the grommet 59 pull toward one another. Increasing the thickness of the outer annular surfaces slightly above the thickness of the inner annular surfaces causes even greater flexing and snugness of fit when the bottom surfaces 74 and 94, respectively, contact a wall. A suitable difference in thickness between the outer annular surface and the inner annular surface is 0.010 inch. The teachings embodied in this grommet 59 make the grommet 59 particularly useful as a reducer and flanges for buffing or grinding wheels.

The strength and flexibility of the grommets 10 and 59 may be varied by the type of hardened plastic or nylon selected and by the thickness selected for the sleeve and flange. Thinner sleeves and flanges allow for a more flexible grommet.

Installation of the grommet 10 or 59 is simply accomplished by insertion of the male member into the female member and pressing them together until the grommet locks. The grommet 10 or 59 is especially easy to install because it consists of two pieces, the female and male members, which fit together from the two sides of a wall. Further, the two pieces, the female and male members, are easily but securely joined.

Referring now to FIG. 5, the grommet 10 or 59 may be disassembled by inserting a dowel 98 or like device into the bore 24 or 64 of the female member sleeve 22 or 62 and urging the dowel against the open end 52 or 92 of the male member sleeve 42 or 82. In FIG. 5, the dowel 98 is shown as having a portion with a smaller circumference 99 which fits into the bore 44 or 84 of the male member sleeve 42 or 82. This helps to provide greater stability for manipulating the dowel 98 when disassembling the grommet 10 or 59.

As should be apparent from the foregoing specification, the invention is susceptible of being modified with various alterations and modifications which may differ from those which have been described in the preceding specification and description. Accordingly, the following claims are intended to cover all alterations and modifications which do not depart from the spirit and scope of the invention.

What is claimed is:

1. A grommet comprising:
   a female member having a female member sleeve which has an inner surface defining a bore through said female member sleeve and which also has an outer surface, said inner surface of said female member sleeve also defining an annular groove, said female member also having a female member flange formed at an end of said female sleeve opposite an open end of said female member sleeve;
   a male member having a male member sleeve slightly smaller than said bore through said female member sleeve, said male member sleeve having an inner surface defining a bore through said male member sleeve and having an outer surface, said outer surface of said male member sleeve having an annular lip corresponding to and for receiving said annular groove defined in said inner surface of said female member sleeve, said male member also having a male member flange formed at an end of said male member sleeve opposite an open end of said male member sleeve, said male member flange having a bottom surface; and
   wherein a distance between said annular groove and said open end of said female member sleeve is slightly greater than a distance between said annular lip and said bottom surface of said male member flange.

2. The invention of claim 1, said inner surface of said male member sleeve defining a rounded opening at said end of said male member sleeve where said male member flange is formed.

3. The invention of claim 1, said annular groove having a toroidal configuration.

4. The invention of claim 3, said annular groove having a depth measured from the inner surface of said female member sleeve of about 0.030 inch.

5. The invention of claim 3, said annular groove having a width of from about 1/16 inch to about 3/32 inch.

6. The invention of claim 1, said male member sleeve having a length slightly less than a length of said female member sleeve.

7. The invention of claim 1, said bottom surface of said female member flange defining an indentation which separates said bottom surface of said female member flange into an outer annular bottom surface and an inner annular bottom surface.

8. The invention of claim 7, wherein said outer annular bottom surface of said female member flange extends a distance above said inner annular bottom surface of said female member flange.

9. The invention of claim 7, wherein said outer annular bottom surface of said female member flange extends a distance of about 0.010 inch above said inner annular bottom surface of said female member flange.

10. The invention of claim 7, wherein a depth of said outer annular bottom surface of said female member flange is greater than a depth of said inner annular bottom surface of said female member flange.

11. The invention of claim 10, wherein a difference between said depth of said outer annular bottom surface of said female member flange and said depth of said inner annular bottom surface of said female member flange is about 0.010 inch.

12. The invention of claim 1, said bottom surface of said male member flange defining an indentation which separates said bottom surface of said male member flange into an outer annular bottom surface and an inner annular bottom surface.

13. The invention of claim 12, wherein said outer annular bottom surface of said male member flange extends a distance above said inner annular bottom surface of said male member flange.

14. The invention of claim 12, wherein said outer annular bottom surface of said male member flange extends a distance of about 0.010 inch above said inner annular bottom surface of said male member flange.

15. The invention of claim 1, said male member sleeve and said bore of said female member sleeve having an allowance of from about 0.002 inch to about 0.004 inch.

16. The invention of claim 1, wherein said distance between said annular groove and said open end of said female member sleeve is about 0.006 inch longer than said distance between said annular lip and said bottom surface of said male member flange.

17. The invention of claim 1, wherein the grommet is comprised of hardened plastic.

18. The invention of claim 1, wherein the grommet is comprised of nylon.

19. A method for installing a grommet comprising:
   providing a grommet which consists of
      a female member having a female member sleeve which has an inner surface defining a bore through said female member sleeve and which also has an outer surface, said inner surface of said female member sleeve also defining an annular groove, said female member also having a female member flange formed at an end of said female member sleeve opposite an open end of said female member sleeve,
      a male member having a male member sleeve slightly smaller than said bore through said female member sleeve, said male member sleeve having an inner surface defining a bore through said male member sleeve and having an outer surface, said outer surface of said male member sleeve having an annular lip corresponding to and for receiving said annular groove defined in said inner surface of said female member sleeve, said male member also having a male member flange formed at an end of said male member sleeve opposite an open end of said male member sleeve, said male member flange having a bottom surface, and
      wherein a distance between said annular groove and said open end of said female member sleeve is slightly greater than a distance between said annular lip and said bottom surface of said male member flange;
   inserting said open end of said male member sleeve into said open end of said female member sleeve; and
   urging said female member and said male member together until said annular lip on said outer surface of said male member sleeve is engaged by and seated into said annular groove defined by said inner surface of said female member sleeve.

* * * * *